Oct. 26, 1965 D. LENZ 3,213,662
FORMATION OF HOLLOW ARTICLES BY EXTRUSION
Filed July 18, 1963 3 Sheets-Sheet 1
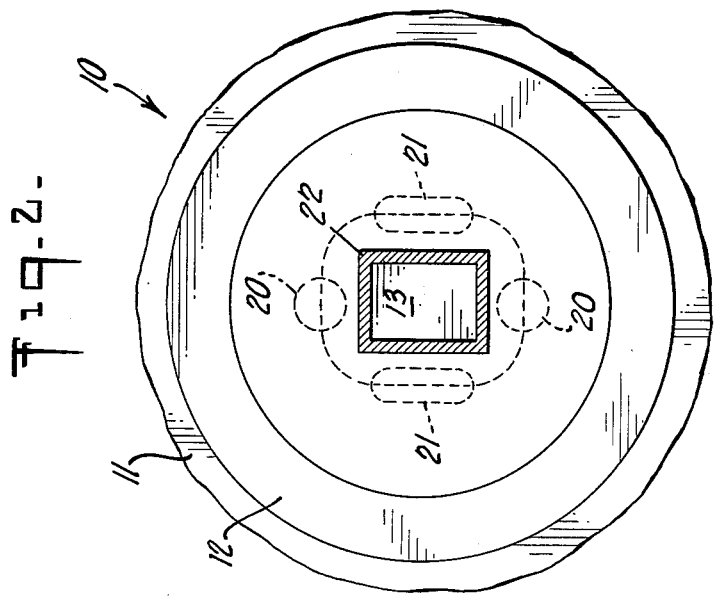
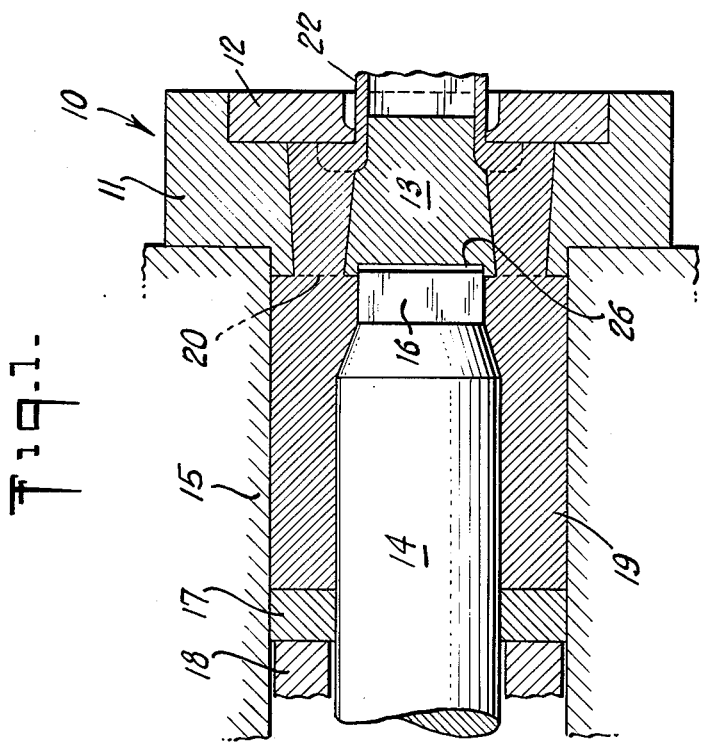
INVENTOR.
DIETER LENZ
BY
Morrison, Kennedy & Campbell
ATTORNEYS.

Oct. 26, 1965 D. LENZ 3,213,662
FORMATION OF HOLLOW ARTICLES BY EXTRUSION
Filed July 18, 1963 3 Sheets-Sheet 2

INVENTOR.
DIETER LENZ
BY
Morrison, Kennedy & Campbell
ATTORNEYS.

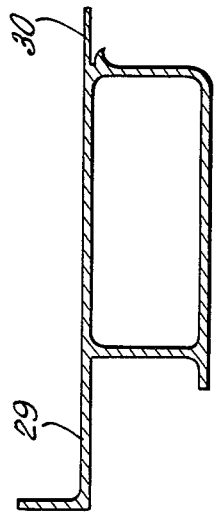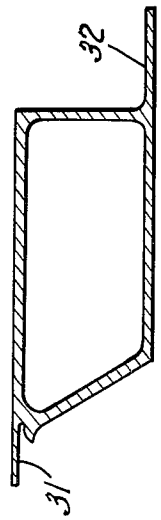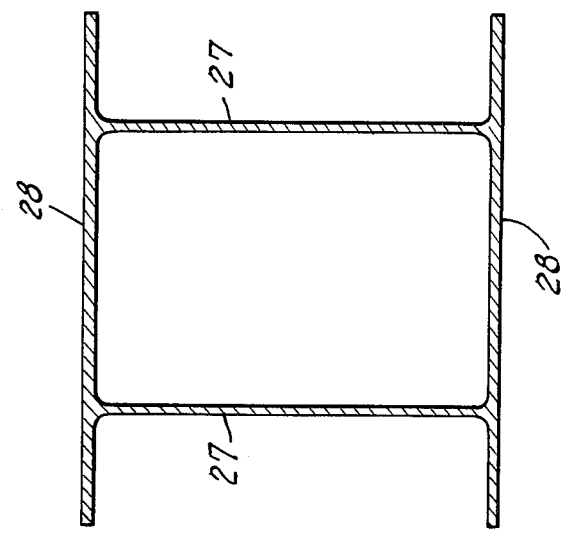

3,213,662
FORMATION OF HOLLOW ARTICLES
BY EXTRUSION
Dieter Lenz, Singen, Hohentwiel, Germany, assignor to Swiss Aluminium Ltd., Chippis, Switzerland, a joint-stock company of Switzerland
Filed July 18, 1963, Ser. No. 296,070
Claims priority, application Switzerland, July 19, 1962,
8,685/62
5 Claims. (Cl. 72—269)

The present invention relates to a method and machine for forming hollow articles by extrusion.

In the extrusion of tubes and other hollow articles of metal, plastic or of any other plastically deformable material, it is customary to use a die surrounding a core which defines the shape of the cavities in the section of the profile to be extruded. The core is usually either progressively slid into the die by the extruder ram which forces the material through the die or is rigidly connected to the die by webs, the die and core forming what is commonly known as a compound tool, and the die consisting ordinarily of a die plate and a die plate holder called die holder.

In the compound tool, inlet apertures are formed between the adjacent webs which connect the core with the die, mainly with the die holder, so that the material can reach the orifice of the die. These apertures usually have a circular or elongated cross section and surround the rear part of the core. The compound tool has to absorb extremely powerful forces because the billet of plastic material is divided by both the core and webs before reaching the die. It is not practicable to lubricate the webs of the core because a film of lubricant on the fresh surfaces produced by division of the material would prevent the surfaces from being welded together again properly in the die memory lines and fissures would be produced in the extruded article.

In the case of many hollow profiles, particularly multiple cavity profiles, it is virtually unavoidable to use a compound tool, since it is not usually possible to use a core which will provide the necessary cross sectional cavities but which is not rigidly connected to the die holder.

When a compound tool is used for manufacturing hollow profiles, the load upon the core depends upon the pressure in the material being extruded and upon the area of the rear surface of the core and webs around and between the inlet apertures. Frequently, the load becomes so great that a risk of tool fracture cannot be totally prevented.

It is the object of the present invention to reduce the load upon the highly stressed core and webs even when the pressure obtainable by the extruder ram is utilized to the fullest extent.

According to the present invention, in a method of extruding hollow articles, a tubular billet of material is placed around a mandrel and is forced axially along the mandrel, around a core and through a die; the core being rigidly connected to the die by a number of webs and the end of the mandrel shielding the central part of the rear surface of the core from the material to relieve the pressure of the material on the core.

The novel method is applicable to the extrusion of articles of any cross-section but is particularly useful in producing large hollow profiles contained in a circumscribed circle approximately 150 mm. of diameter or larger, and having a number of cavities or having a relatively large internal diameter.

The invention also includes a machine for carrying out the novel method, the machine comprising a die to which a core for defining the shape of the cavities in the section of the profile to be extruded is rigidly connected by webs, and a mandrel which extends rearwardly from the core and shields the central part of the rear surface of the core during extrusion to relieve the pressure of the material being extruded on the core, the mandrel being independent of an extruder ram which is arranged in use to force a tubular billet of the material surrounding the mandrel axially along the mandrel, around the core and through the die.

The mandrel is particularly efficient in relieving the pressure on the compound tool, that is to say the core together with the die holder, when the mandrel is secured to an abutment behind the extruder ram. This is because the pressure which is produced by friction of the billet to be extruded against the mandrel is transmitted through the mandrel to the abutment.

The size and shape of the end of the mandrel which engages the rear of the core is governed substantially by the size and arrangement of the inlet apertures surrounding the core. The end of the mandrel should however be as large as possible, so that it relieves the pressure of the material on as great an area of the core as possible. In addition, it is preferable for the front end of the mandrel to cooperate telescopically with the rear surface of the core, so that the mandrel continues to shield the core, even when the core is displaced elastically to a small extent relatively to the mandrel under the pressure of the material. For example, the rear surface of the core may be provided with a depression, approximately 10 to 15 mm. deep, in which the end of the mandrel slides. This construction prevents any of the material to be extruded from penetrating between the end of the mandrel and the surface of the core when the core is displaced elastically by the extrusion pressure. If the extruded material were not prevented from penetrating at this point, the core might be fractured upon relaxation at the end of an extrusion process, because the material which had penetrated between the mandrel and core would prevent the core from returning to its initial position.

If it is not possible to use a relieving mandrel secured to an abutment behind a ram, for example because there is either no suitable abutment present or because the frictional forces on the mandrel exceed the permissible value, a freely movable floating relieving mandrel may be used. This must be supported by the pressure plate of the ram and the tubular billet of material surrounding the mandrel, and must be retained by the core of the compound tool during the extrusion process. In this case, the compound tool need not cooperate telescopically with the mandrel because the mandrel participates in all the displacements of the compound tool under the effect of the extrusion pressure.

The relieving mandrel should not be lubricated, since otherwise impurities would enter the compound tool and prevent the various veins of metal passing around the webs from being welded together again in the die.

It is convenient for the extrusion to be performed in the same way as the customary extrusion of tubes. The mandrel and billet are first pushed into the extrusion cylinder of the machine until the mandrel meets a stop. The die with the core are then brought into position and, when a fixed mandrel is used, the mandrel engages in the depression on the rear surface of the core. In the case of a floating mandrel, the mandrel is repelled slightly by the die, for example through as much as 40 mm. The billet is then upset and then released. The press container is then moved backwards and forwards to evacuate the air. After that, the extrusion takes place in the usual way and at the end of an extrusion operation, the residue is run out and sheared off.

One example of a machine constructed in accordance with the invention and three typical profiles extruded by similar machines are illustrated in the accompanying drawings, in which:

FIGURE 1 is a longitudinal section through the machine;

FIGURE 2 is a front elevation of the machine;

Figure 3:
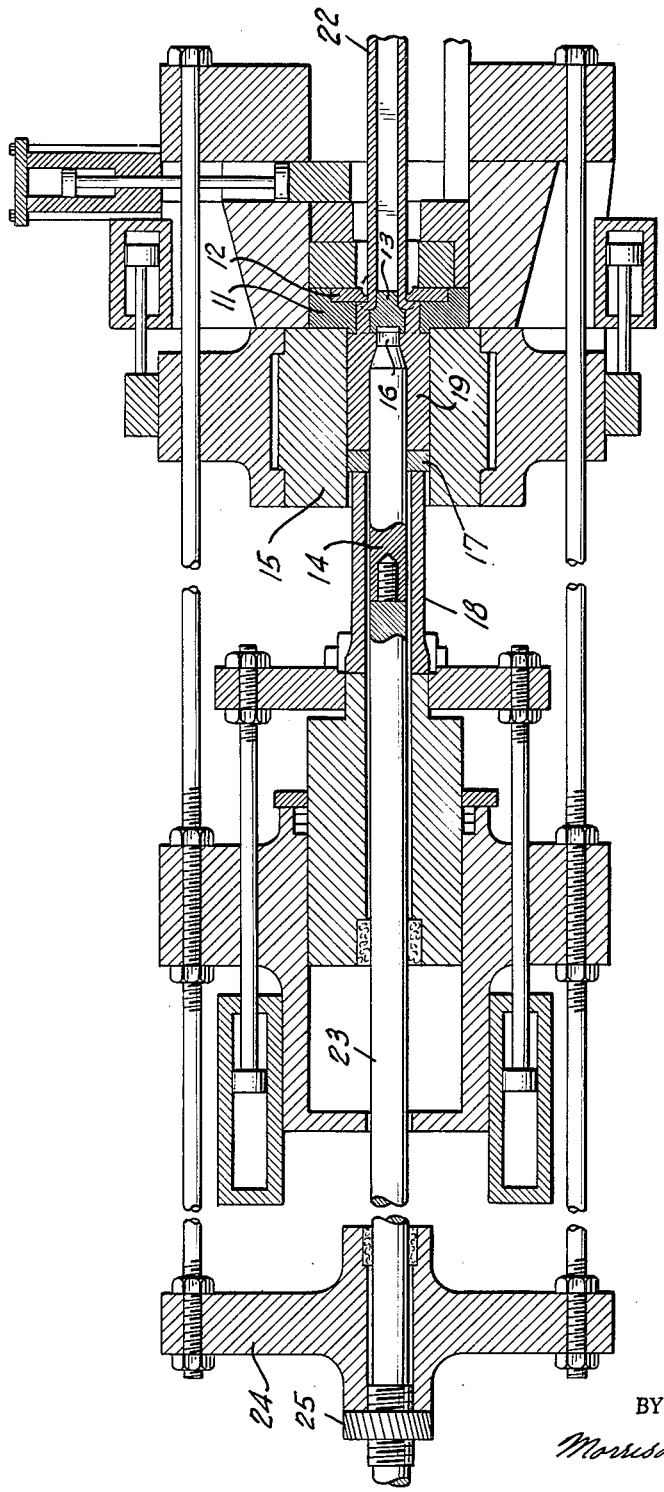
FIGURE 3 is a longitudinal section through part of the machine on a larger scale; and, FIGURES 4 and 5 and 6 show, in cross-section, examples of comparatively thin walled hollow profiles which can be manufactured by the method according to the invention.

Referring to the drawings, the machine has a billet container 15 and a compound tool 10 consisting of a die holder 11, a plate die 12 and a core 13, which is firmly connected to the die holder by webs, not shown. The rear working face of the compound tool, which parts the tubular billet 19 of aluminum to be extruded is free of projecting parts in order to facilitate the separation of the material. A relieving mandrel 14, which is secured to an abutment 24 via a mandrel rod 23 by means of an adjustable spindle wheel 25 (FIGURE 3), is provided with a face attachment 16, the cross-section of which conforms to that of the tube to be extruded and which in the case of the illustrated machine is rectangular. An annular pressure plate 17 is forced in a direction towards the die by a hollow ram 18. Under the extrusion pressure, the metal flows through the inlet apertures 20 and 21 around the core 13 and is extruded as a rectangular tube 22 between the die 12 and the front portion of the core 13.

The compound tool 10 yields slightly to the extrusion pressure. In order to allow for this movement, and to prevent the extruded material from penetrating between the rear face of the core 13 and the end wall of the face attachment 16 of the relieving mandrel 14, a depression 26 is formed in the core 13, and the front portion of the face attachment 16 slides telescopically within it with a snug conforming slide fit.

It will be observed that the major portion of the core 13 is relieved by the mandrel 14. It is only the annular portion around the face attachment 16 that is subject to extrusion pressure during the extrusion process.

The profile shown in FIGURE 4 has a width of 300 mm. and a height of 250 mm., the bars 27 a thickness of 5 mm. and the wall parts 28 a thickness of 8 mm. The cross-section of the cavity measures 160 x 234 mm.

The profile shown in FIGURE 5 has a maximum dimension of 290 mm., its walls have a thickness of 5 mm., as does the flange 29, whereas the flange 30 has a thickness of only 3 mm. The cross-section of the cavity measures 155 x 59 mm.

The profile according to FIGURE 6 has a maximum dimension of 275 mm. and a universal wall thickness of 5 mm. The flange 31 has a thickness of 5 mm. and the flange 32 has a thickness of 3 mm.

The method according to the invention has the following advantages compared with the customary method using a compound tool.

The relieving mandrel adjoins the core and covers a corresponding fraction of the free surface of the core 13, so that the total load upon the latter by the extrusion force is reduced.

The specific extrusion pressure is greater than when solid rather than tubular billets of material are extruded through the same die.

The extrusion temperature can be selected as required for the materials. The high extrusion temperature, which is otherwise necessary, is avoided, so that it is possible to relay upon higher strength values for the tool steel.

The moulding ratio (deformation ratio) is smaller; consequently, the requisite extrusion pressure is also lower.

The flow process is easier to start up.

The combination tool is better protected against fracture.

What is claimed is:

1. A machine for forming hollow articles by extrusion comprising an extrusion die, a core for defining the shape of the cavities in the section of the profile to be extruded, means for securing said core in position and comprising webs connected to said core and defining spaces therebetween for the passage of the material to be extruded therethrough, a mandrel extending rearwardly from the core and shielding the central part of the rear surface of the core to relieve the pressure of the material on the core during extrusion, the forward shielding end of said mandrel being separable from said core to permit interchange of mandrel shielding ends according to the shape of the profile to be extruded, and an extrusion ram independent of said mandrel and arranged to force a tubular billet of the material surrounding the mandrel axially along the mandrel, around the core and through the die.

2. A machine according to claim 1, comprising an abutment to which the mandrel is secured behind the extruder ram.

3. A machine for forming hollow articles by extrusion comprising an extrusion die, a core for defining the shape of the cavities in the section of the profile to be extruded, means for securing said core in position and comprising webs connected to said core and defining spaces therebetween for the passage of the material to be extruded therethrough, a mandrel extending rearwardly from the core and shielding the central part of the rear surface of the core to relieve the pressure of the material on the core during extrusion, the front end of the mandrel having a telescopic snug conforming slide connection with the rear end of the core, whereby the mandrel continues to shield the rear end of the core even when the core is displaced elastically to a small extent relative to the mandrel under the pressure of the material being extruded, and an extrusion ram independent of said mandrel and arranged to force a tubular billet of the material surrounding the mandrel axially along the mandrel, around the core and through the die.

4. A machine for forming coreless hollow articles by extrusion comprising an extrusion die, a core for defining the shape of the cavities in the section of the profile to be extruded, the forward end of said core having a solid wall extending thereacross, means for securing said core in position and comprising webs connected to said core and defining spaces therebetween for the passage of the material to be extruded therethrough, a mandrel extending rearwardly from the core and shielding the central part of the rear surface of the core to relieve the pressure of the material on the core during extrusion, and an extrusion ram independent of said mandrel and arranged to force a tubular solid billet of the material surrounding the mandrel axially along the mandrel, around the core and through the die, said core and said die comprising means for causing the material to be extruded from said die as a hollow body free from any internal filling support separate from said hollow body.

5. A machine for forming a coreless hollow article by extrusion as described in claim 4, wherein the mandrel is of solid construction free from fluid passages extending therealong.

References Cited by the Examiner

UNITED STATES PATENTS

| | | | |
|---|---|---|---|
| 363,182 | 5/87 | Tatham | 207—4 |
| 1,575,768 | 3/26 | Judge | 207—4 |
| 2,638,213 | 5/53 | Clark | 207—17 |
| 2,819,794 | 1/58 | Krause | 207—19 |

FOREIGN PATENTS 1,115,686  10/61  Germany.

CHARLES W. LANHAM, *Primary Examiner.*

MICHAEL V. BRINDISI, *Examiner.*